April 26, 1927.
W. H. BROADFIELD
ENGINE
Filed Dec. 7, 1922
1,625,880
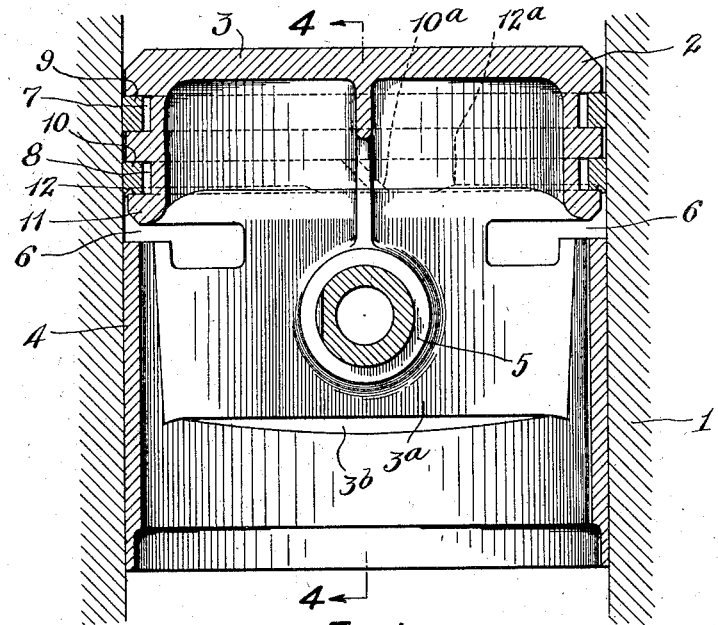
FIG. 1.
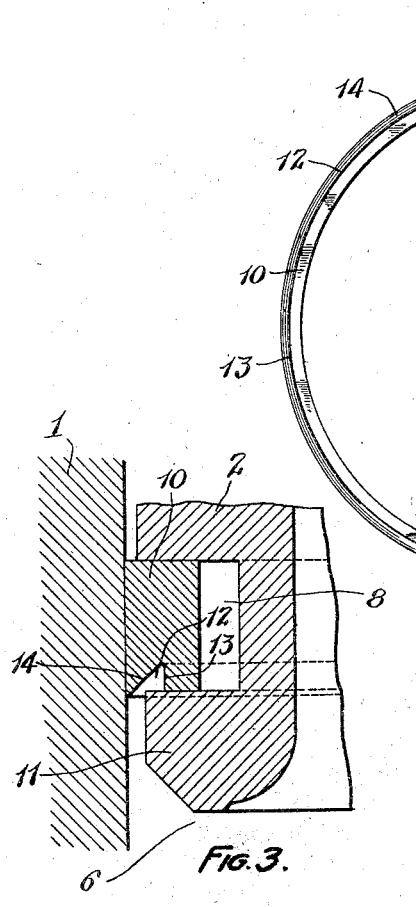
FIG. 2.
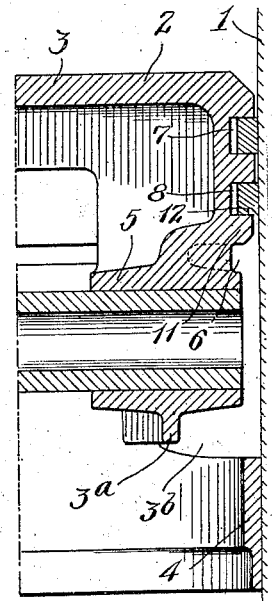
FIG. 3.
FIG. 4.
INVENTOR:
WARD HOLT BROADFIELD
BY
Geo N. Pitts ATTORNEY.

Patented Apr. 26, 1927.

1,625,880

UNITED STATES PATENT OFFICE.

WARD HOLT BROADFIELD, OF CANTON, OHIO, ASSIGNOR TO THE H. H. MILLER INDUSTRIES COMPANY, OF CANTON, OHIO, A CORPORATION OF OHIO.

ENGINE.

Application filed December 7, 1922. Serial No. 605,508.

This invention relates to an engine, more particularly an engine of the internal combustion type.

One object of the invention is to provide in an engine, improved means for preventing the passage of oil past the piston.

Another object of the invention is to provide an improved piston and piston ring which are constructed to collect oil on the cylinder walls, prevent it from passing the piston in to the combustion end of the cylinder, while the engine is running, and permit the oil to flow back into the engine crank case.

A further object of the invention is to provide a piston ring having an oil collecting groove or channel in its under surface, but which groove or channel terminates at points remote from the ends of the ring so as to prevent the escape of the oil into the joint for the ring.

Other objects of the invention will be apparent to those skilled in the art to which my invention relates from the following description taken in connection with the following drawings, wherein—

Fig. 1 is a fragmentary sectional view of an engine embodying my invention.

Fig. 2 is a bottom plan view of the oil collecting ring.

Fig. 3 is a fragmentary section, enlarged.

Fig. 4 is a section on the line 4—4 of Fig 1.

In the drawings, 1 indicates an engine cylinder, which may be of any desired construction. To simplify the illustration, a fragmentary portion only of the walls of one cylinder is shown, but it will be understood that there may be as many cylinders as desired. My invention may be applied to engines of varying types and also engines in which different kinds of motive power may be used. In the present application of my invention I have shown it embodied in an engine of the internal combustion type. 2 indicates as an entirety a piston which may be cast from aluminum or other alloys, as desired. The piston 2 comprises a head 3, a skirt 4 and bosses 5. At opposite sides the skirt is provided with bridging sections 3ª (only one being shown), which support the bosses 5, and between the bosses 5, (but preferably in a plane slightly above them), the skirt 4 is formed with openings 6 extending circumferentially thereof. The lower edge of each bridging section 3ª is separated from the adjacent portion of the skirt 4 to provide an opening 3ᵇ. The purpose of the openings 6 and 3ᵇ will later be set forth. 7, 8, indicate annular grooves formed in the upper portion of the skirt 4 and adapted to respectively receive a compression ring 9 and an oil collecting ring 10, thereby providing an annular wall 11 below the ring groove 8. The upper portion of the skirt 4, and the curved sections between the bridging sections 3ª have the same diameter, but for reasons which will later appear, the annular wall 11 is slightly smaller in diameter, approximately 1/64th of an inch.

The compression ring 9 may be of any desired construction, for example, such as shown in Patent No. 1,280,493 granted to Stewart S. Kurtz, Jr., Oct. 1, 1918. The ring 10 is preferably made in one piece and jointed at its ends in any desired manner. In the preferred form of construction, as illustrated, the opposite ends of the ring 10 are cut at an angle, as shown at 10ª, so that they overlap, for well known reasons.

12 indicates an oil collecting groove formed in the underside or surface of the ring 10 and extending from a point near one end of the ring to a point near its opposite ends. As shown in Fig. 3, the groove 12 is formed by cutting the metal away to form a substantially vertical wall 13 and an inclined wall 14. The inclined wall 14 extends downwardly and outwardly to the outer circumferential surface of the ring 10, forming therewith a relatively thin sharp edge, which serves to engage the oil on the interior wall of the cylinder 1, scrape it therefrom and guide the oil inwardly into the groove 12 as the piston reciprocates. The groove 12 therefore serves to receive and collect the oil scraped from the cylinder wall, and prevent it from passing the piston and accumulating in the space thereabove.

By making the wall 11 of the piston skirt below the groove 8 of slightly less diameter than its upper portion, space is provided to permit the oil collected by the ring 10 to flow downwardly into the crank case of the engine. By providing the piston skirt with openings 6 and 3ᵇ below the annular wall 11, it will be seen that the escape of the oil is greatly facilitated, since it can flow through these openings into the piston and then through its open end.

It will be noted from Fig. 2 of the drawings, that the groove 12 terminates at points remote from the opposite ends of the piston ring 10, as shown at 12ª, the purpose of this form of construction being to prevent the oil collected in the ring groove 12 from flowing circumferentially and escaping into the joint between the ends of the ring or the space between these ends, and hence past the piston into the cylinder space thereabove. In actual practice, I have found that by terminating the oil collecting groove 12 or closing its opposite ends at points remote from the ring ends, I am enabled to prevent the flow or escape of the oil into the ring joint, and hence by keeping the oil out of this joint, I am enabled to prevent its escape past the piston and the manifold disadvantages which would thus result. In forming the groove 12 in the piston ring, I prefer to hold the latter within a cylindrical shaped support, the inner wall of which engages the outer circumferential surface of the ring 10. Accordingly, in cutting the groove 13 the tool forces or displaces the metal at the free end of the inclined wall 14 outwardly so that the scraping edge of the ring thus formed is disposed or extends slightly beyond the plane of that surface of the ring which constitutes its under surface when in use.

To those skilled in the art to which my invention relates, many modifications and applications of the invention will suggest themselves without departing from the spirit and scope thereof. The illustrations and the disclosure herein are purely illustrative and are not intended to be in any sense limiting.

What I claim is:

1. In an engine, the combination with a cylinder, of a piston having a head and a skirt, said skirt being formed with an annular groove, and a ring mounted in said annular groove, said ring being formed in its under surface with a recess extending from a point remote from one end to a point remote from its other end and closed at its opposite ends to prevent oil from flowing into the joint of the ring, and the outer wall of the recess in said ring extending outwardly and downwardly beyond the lower surface of said ring and forming with the outer surface of the ring a relatively thin edge disposed below the lower surface thereof and adapted to scrape oil from the wall of the cylinder and guide it into said recess.

2. In an engine, the combination with a cylinder, of a piston having a head and a skirt, said skirt being formed with an annular groove and provided with an annular wall adjacent said groove of less diameter than the diameter of said skirt, and a ring mounted in said annular groove, said ring being formed in its under surface with a recess extending from a point remote from one end to a point remote from its other end and closed at its opposite ends to prevent oil from flowing into the joint of the ring and the outer wall of said recess extending outwardly and downwardly beyond the lower surface of said ring and forming with the outer periphery thereof a relatively sharp scraping edge disposed below said lower surface and adapted to scrape oil from the wall of said cylinder.

3. In an engine, the combination with a cylinder, of a piston having a head and a skirt, the upper portion of said skirt being formed with an annular groove and the lower portion being provided with pin bosses and formed with openings at points above and below the latter and the wall of said skirt between said groove and the adjacent opening being of less diameter than the upper portion of said skirt, and a ring mounted in said annular groove, the lower surface of said ring being formed with a recess having outer and inner walls terminating at points beyond and within the circumferential edge of the lower wall of said groove, respectively, whereby a recess is formed between said groove wall and said inner wall of the recess.

4. A piston ring comprising an annular member having its ends shaped to form a joint between them and formed in one surface with a groove extending circumferentially of said member and terminating at points remote from its opposite ends to prevent oil collected in said groove when the ring is in use from flowing into said joint, the outer wall of the groove being inclined outwardly and downwardly and extending to a point beyond the plane of the adjacent surface of the ring and forming with the outer peripheral face of the ring a relatively sharp scraping edge.

In testimony whereof, I have hereunto subscribed my name.

WARD HOLT BROADFIELD.